(12) United States Patent
Santoso et al.

(10) Patent No.: US 9,458,812 B2
(45) Date of Patent: Oct. 4, 2016

(54) ENGINE CONTROL SYSTEMS AND METHODS FOR MINIMIZING FUEL CONSUMPTION

(75) Inventors: Halim G Santoso, Novi, MI (US); Eugene V. Gonze, Pinckney, MI (US); Brian Spohn, Holly, MI (US); Bryan Nathaniel Roos, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 365 days.

(21) Appl. No.: 12/552,503

(22) Filed: Sep. 2, 2009

(65) Prior Publication Data

US 2011/0047980 A1 Mar. 3, 2011

(51) Int. Cl.
| | |
|---|---|
| *F01N 3/00* | (2006.01) |
| *F02N 11/08* | (2006.01) |
| *B60K 6/48* | (2007.10) |
| *B60W 10/06* | (2006.01) |
| *B60W 10/08* | (2006.01) |

(Continued)

(52) U.S. Cl.
CPC .............. *F02N 11/084* (2013.01); *B60K 6/48* (2013.01); *B60W 10/06* (2013.01); *B60W 10/08* (2013.01); *B60W 20/00* (2013.01); *F02M 26/06* (2016.02); *B60L 2240/423* (2013.01); *B60L 2240/445* (2013.01); *B60W 2510/068* (2013.01); *B60W 2510/0676* (2013.01); *B60W 2710/0666* (2013.01); *B60W 2710/083* (2013.01); *F02D 41/0087* (2013.01); *F02D 41/0235* (2013.01); *F02D 2200/0802* (2013.01); *F02D 2250/18* (2013.01); *Y02T 10/121* (2013.01); *Y02T 10/48* (2013.01); *Y02T 10/54* (2013.01); *Y02T 10/6221* (2013.01); *Y02T 10/6286* (2013.01); *Y02T 10/642* (2013.01)

(58) Field of Classification Search
CPC ....... B60K 6/48; B60W 10/06; B60W 10/08; B60W 20/00; F02M 26/06; F02N 11/084
USPC .................. 60/273, 274, 284, 285, 286, 287
See application file for complete search history.

(56) References Cited

U.S. PATENT DOCUMENTS

| | | |
|---|---|---|
| 3,577,164 A | 5/1971 | Re Baratelli et al. |
| 4,221,205 A | 9/1980 | Koehler |

(Continued)

FOREIGN PATENT DOCUMENTS

| | | |
|---|---|---|
| DE | 4100133 A1 | 7/1992 |
| DE | 4231711 A1 | 4/1993 |

(Continued)

OTHER PUBLICATIONS

English machine translation of JP 10-228028A.

(Continued)

*Primary Examiner* — Thomas Denion
*Assistant Examiner* — Matthew T Largi

(57) ABSTRACT

An engine control system comprises a temperature control module and an engine disabling module. The temperature control module regulates a first temperature of an electrically heated catalyst (EHC) based on a first predetermined light-off temperature while an engine is shut down. The engine disabling module selectively disables start up of the engine when a second temperature of a passive catalyst is less than a second predetermined light-off temperature while a maximum torque output of an electric motor is greater than a desired torque output.

16 Claims, 4 Drawing Sheets

(51) Int. Cl.
   *B60W 20/00* (2016.01)
   *F02D 41/00* (2006.01)
   *F02D 41/02* (2006.01)

(56) References Cited

U.S. PATENT DOCUMENTS

| | | | |
|---|---|---|---|
| 5,163,290 A | 11/1992 | Kinnear | |
| 5,224,335 A | 7/1993 | Yoshizaki | |
| 5,234,668 A | 8/1993 | Harada et al. | |
| 5,257,501 A | 11/1993 | Wataya | |
| 5,345,761 A | 9/1994 | King et al. | |
| 5,465,573 A | 11/1995 | Abe et al. | |
| 5,537,321 A | 7/1996 | Yoshizaki et al. | |
| 5,566,774 A | 10/1996 | Yoshida | |
| 5,588,291 A | 12/1996 | Maus et al. | |
| 5,689,952 A | 11/1997 | Kato et al. | |
| 5,713,198 A | 2/1998 | Aoki et al. | |
| 5,785,137 A | 7/1998 | Reuyl | |
| 5,785,138 A | 7/1998 | Yoshida | |
| 5,791,140 A | 8/1998 | Shimasaki et al. | |
| 5,857,325 A | 1/1999 | Shimasaki et al. | |
| 5,950,419 A * | 9/1999 | Nishimura et al. | 60/274 |
| 5,966,931 A * | 10/1999 | Yoshizaki et al. | 60/284 |
| 6,057,605 A | 5/2000 | Bourne et al. | |
| 6,122,910 A | 9/2000 | Hoshi et al. | |
| 6,131,538 A | 10/2000 | Kanai | |
| 6,151,890 A | 11/2000 | Hoshi | |
| 6,167,696 B1 | 1/2001 | Maaseidvaag et al. | |
| 6,189,316 B1 | 2/2001 | Surnilla et al. | |
| 6,209,672 B1 * | 4/2001 | Severinsky | B60K 6/442 180/65.23 |
| 6,244,043 B1 | 6/2001 | Farmer et al. | |
| 6,324,835 B1 | 12/2001 | Surnilla et al. | |
| 6,394,209 B1 | 5/2002 | Goehring et al. | |
| 6,532,926 B1 | 3/2003 | Kuroda et al. | |
| 6,543,219 B1 | 4/2003 | Surnilla | |
| 6,557,505 B1 | 5/2003 | Hori | |
| 6,585,940 B2 | 7/2003 | Abe et al. | |
| 6,651,422 B1 | 11/2003 | LeGare | |
| 6,735,937 B2 | 5/2004 | Surnilla et al. | |
| 6,799,421 B2 | 10/2004 | Surnilla | |
| 6,820,471 B2 | 11/2004 | Ito | |
| 6,853,895 B2 | 2/2005 | Javaherian | |
| 6,895,744 B2 * | 5/2005 | Osawa | 60/277 |
| 7,077,224 B2 * | 7/2006 | Tomatsuri et al. | 180/65.235 |
| 7,213,665 B2 * | 5/2007 | Yamaguchi et al. | 180/65.27 |
| 7,363,915 B2 | 4/2008 | Surnilla et al. | |
| 7,603,227 B2 | 10/2009 | Watanabe et al. | |
| 7,707,821 B1 | 5/2010 | Legare | |
| 7,792,627 B1 | 9/2010 | Santoso et al. | |
| 7,829,048 B1 | 11/2010 | Gonze et al. | |
| 7,934,487 B2 | 5/2011 | Santoso et al. | |
| 8,209,970 B2 | 7/2012 | Gonze et al. | |
| 8,359,844 B2 | 1/2013 | Gonze et al. | |
| 8,413,423 B2 | 4/2013 | Roos et al. | |
| 2003/0172643 A1 | 9/2003 | Suzuki | |
| 2004/0045753 A1 | 3/2004 | Yamaguchi et al. | |
| 2004/0111199 A1 | 6/2004 | Javaherian | |
| 2006/0278449 A1 | 12/2006 | Torre-Bueno | |
| 2007/0186876 A1 | 8/2007 | Elwart et al. | |
| 2008/0099259 A1 | 5/2008 | Tomo | |
| 2008/0133114 A1 | 6/2008 | Okubo et al. | |
| 2008/0282673 A1 | 11/2008 | Gonze et al. | |
| 2009/0025371 A1 * | 1/2009 | Hermansson | B60K 6/445 60/286 |
| 2010/0192122 A1 | 7/2010 | Esfahan et al. | |
| 2010/0205939 A1 | 8/2010 | Sano et al. | |
| 2010/0212981 A1 | 8/2010 | Roos et al. | |
| 2011/0078999 A1 | 4/2011 | Gonze et al. | |

FOREIGN PATENT DOCUMENTS

| | | | |
|---|---|---|---|
| DE | 60307939 T2 | 9/2007 | |
| EP | 0935056 * | 8/1999 | F01N 3/20 |
| JP | 09158715 | 6/1997 | |
| JP | 10288028 | 10/1998 | |
| JP | 2003227386 | 8/2003 | |
| WO | WO-2007107135 A1 | 9/2007 | |

OTHER PUBLICATIONS

Office Action dated Mar. 30, 2012 from the German Patent Office for German Patent Application No. 10 2010 035 480.5; 6 pages.
U.S. Appl. No. 12/571,729, filed Oct. 1, 2009, Eugene V. Gonze.
U.S. Appl. No. 12/392,438, filed Feb. 25, 2009, Bryan Nathaniel Roos.

* cited by examiner

ENGINE CONTROL SYSTEMS AND METHODS FOR MINIMIZING FUEL CONSUMPTION

FIELD

The present disclosure relates to engine control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to produce drive torque. A byproduct of combustion is exhaust gas. The exhaust gas may include various components, such as nitrogen oxides (NOx), carbon monoxide (CO), and hydrocarbons (HC). An exhaust treatment system includes a catalyst that converts the NOx, CO, and HC to carbon dioxide and water.

Conversion efficiency of the catalyst refers to the catalyst's ability to react with or convert one or more components of the exhaust gas. The conversion efficiency of the catalyst is related to the temperature of the catalyst. The catalyst may operate at a reduced conversion efficiency when the catalyst temperature is less than a threshold temperature, which is referred to as a light-off temperature. The catalyst's conversion efficiency may be increased by regulating the catalyst temperature at or above the light-off temperature.

The catalyst temperature may be increased using various methods. For example only, heat from the exhaust gas expelled from the engine may increase the catalyst temperature. The exhaust gas transfers heat to the catalyst via convection, thereby increasing the catalyst temperature. Fueling to the engine may also be adjusted to increase the catalyst temperature. For example only, unburned HC resulting from combustion may enter the catalyst where the HC oxidizes and increases the catalyst temperature.

Hybrid vehicles generally include the internal combustion engine and an electric motor. The electric motor may be used for propulsion during city driving where vehicle kinetic energy can be recovered by regenerative braking and stored in an energy storage device. The recovered energy can later be used to drive the electric motor.

The internal combustion engine may be more suitable during highway driving, during which braking and opportunities for energy recovery are infrequent, and the engine operates at its greatest efficiency. Accordingly, the internal combustion engine may be used for vehicle propulsion during highway driving. In mixed city and highway driving conditions, the electric motor may be used together with the combustion engine.

SUMMARY

An engine control system comprises a temperature control module and an engine disabling module. The temperature control module regulates a first temperature of an electrically heated catalyst (EHC) based on a first predetermined light-off temperature while an engine is shut down. The engine disabling module selectively disables start up of the engine when a second temperature of a passive catalyst is less than a second predetermined light-off temperature while a maximum torque output of an electric motor is greater than a desired torque output.

In other features, the engine control system further comprises a torque control module. The torque control module selectively initiates the start up of the engine when the desired torque is greater than the maximum torque output when the engine is shut down.

In still other features, the torque control module controls a first torque output by the engine and a second torque output by the electric motor based on the desired torque output after the start up.

In further features, the engine disabling module shuts down the engine after the start up when the maximum torque output is greater than the desired torque output.

In still further features, the engine disabling module shuts down the engine when, after the start up, the second temperature is less than the second predetermined light-off temperature and the maximum torque output is greater than the desired torque output.

In other features, after the start up, the torque control module selects a warming strategy for the catalyst and controls the engine based on the warming strategy.

In still other features, after the start up, the torque control module provides a stoichiometric air/fuel mixture to a cylinder of the engine and retards a spark timing of the cylinder.

In further features, after the start up, the torque control module provides a rich air/fuel mixture to a first cylinder of the engine and disables provision of fuel and spark to a second cylinder of the engine.

A hybrid vehicle system comprises the engine control system, the EHC, and the passive catalyst.

A method comprises: regulating a first temperature of an electrically heated catalyst (EHC) based on a first predetermined light-off temperature while an engine is shut down; and selectively disabling start up of the engine when a second temperature of a passive catalyst is less than a second predetermined light-off temperature while a maximum torque output of an electric motor is greater than a desired torque output.

In other features, the method further comprises selectively initiating the start up of the engine when the desired torque is greater than the maximum torque output when the engine is shut down.

In still other features, the method further comprises controlling a first torque output by the engine and a second torque output by the electric motor based on the desired torque output after the start up.

In further features, the method further comprises shutting down the engine after the start up when the maximum torque output is greater than the desired torque output.

In still further features, the method further comprises shutting down the engine when, after the start up, the second temperature is less than the second predetermined light-off temperature and the maximum torque output is greater than the desired torque output.

In other features, after the start up, the method further comprises selecting a warming strategy for the catalyst and controlling the engine based on the warming strategy.

In still other features, after the start up, the method further comprises providing a stoichiometric air/fuel mixture to a cylinder of the engine and retarding a spark timing of the cylinder.

In further features, after the start up, the method further comprises providing a rich air/fuel mixture to a first cylinder of the engine and disabling provision of fuel and spark to a second cylinder of the engine.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
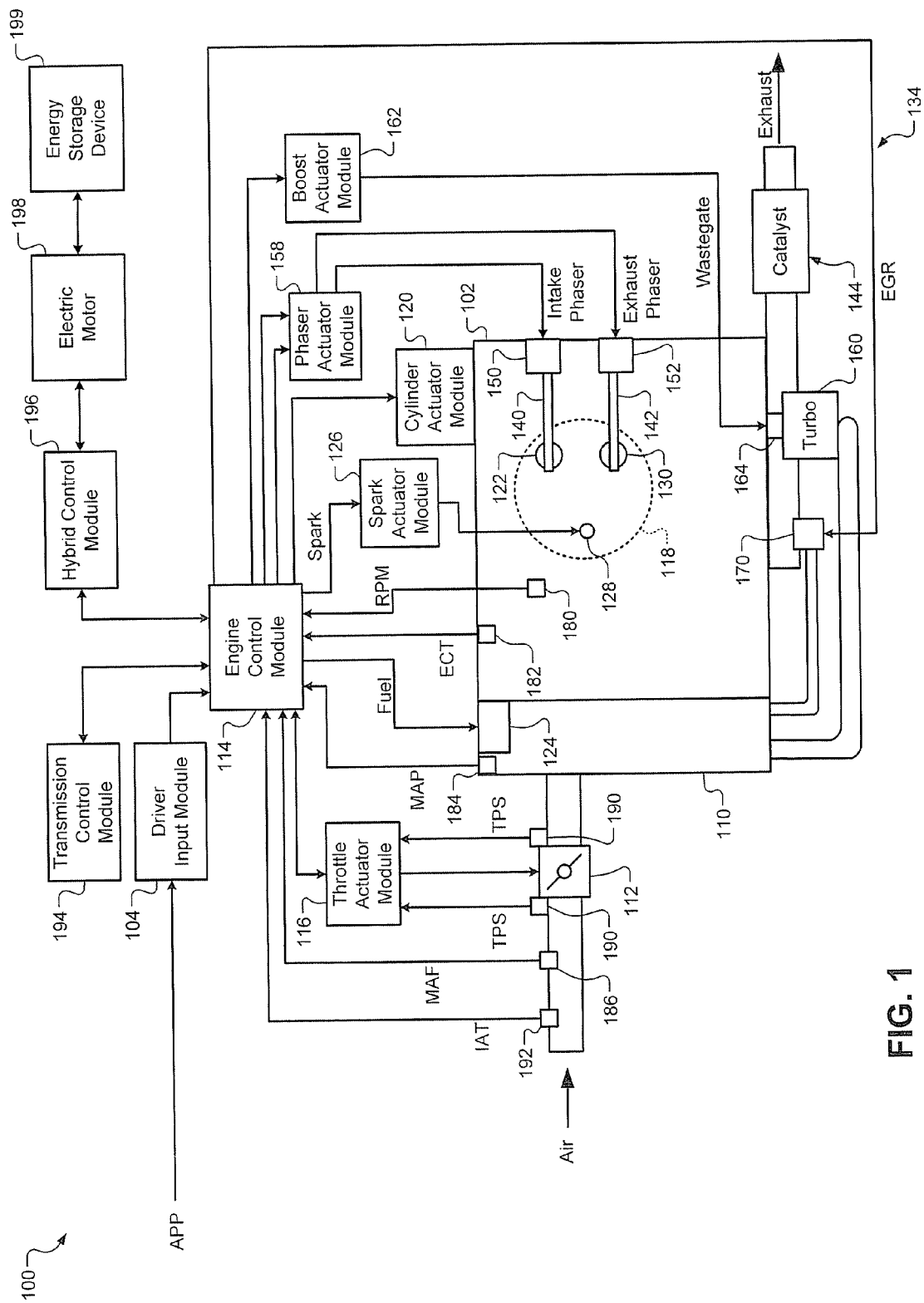
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable hardware components that provide the described functionality. displayed by the user interface 108, such as the present location of the storage and retrieval machines 10A, 10B and 10C, within the facility or instructions to a storage and retrieval of particular palletized loads.

In hybrid vehicles, an engine and/or an electric motor produce drive torque for vehicle propulsion. An engine control module (ECM) controls the engine and the electric motor. The ECM selectively starts up and shuts down the engine. The ECM may shut down the engine in some circumstances to, for example, improve fuel economy and reduce emissions.

A catalyst (e.g., a three-way catalyst) receives exhaust gas output by the engine and reacts with various components of the exhaust gas. The exhaust gas produced by the engine is beneficially used to increase the temperature of the catalyst. The ECM generally starts up the engine when the temperature of the catalyst is less than a predetermined light-off temperature to warm the catalyst and maintain the catalyst temperature at or above the light-off temperature.

The ECM of the present disclosure selectively disables engine startups when the catalyst temperature is less than the light-off temperature. More specifically, the ECM disables engine startups when a maximum torque output of the electric motor is greater than a desired torque output for the vehicle when the catalyst temperature is less than the light-off temperature. In this manner, the ECM disables engine startups initiated for catalyst warming and limits engine startups to when the desired torque output exceeds the maximum torque output of the electric motor.

Referring now to FIG. 1, a functional block diagram of an exemplary engine system 100 is presented. The engine system 100 includes an engine 102 that combusts an air/fuel mixture to produce torque for a vehicle based on driver inputs provided by a driver input module 104. The driver inputs may include, for example, an accelerator pedal position (APP) measured by an APP sensor (not shown).

Air is drawn into an intake manifold 110 through a throttle valve 112. An engine control module (ECM) 114 commands a throttle actuator module 116 to regulate opening of the throttle valve 112 to control the amount of air drawn into the intake manifold 110. Air from the intake manifold 110 is drawn into cylinders of the engine 102. While the engine 102 may include multiple cylinders, for illustration purposes only, a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders to, for example, minimize fuel consumption.

Air from the intake manifold 110 is drawn into the cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134. The exhaust system 134 includes a catalyst 144. The catalyst 144 reacts with various components of the exhaust gas to reduce amounts of those components in the exhaust gas.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by halting provision of fuel and spark and/or disabling their exhaust and/or intake valves.

The time at which the intake valve 122 is opened may be varied with respect to piston TDC by an intake cam phaser 150. The time at which the exhaust valve 130 is opened may be varied with respect to piston TDC by an exhaust cam phaser 152. A phaser actuator module 158 controls the intake cam phaser 150 and the exhaust cam phaser 152 based on signals from the ECM 114.

The engine system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The air used to produce the compressed air charge may be taken from the intake manifold 110.

A wastegate 164 may allow exhaust gas to bypass the turbocharger 160, thereby reducing the turbocharger's output (or boost). The ECM 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate some of the compressed air charge's heat, which is generated when air is compressed and may also be increased by proximity to the exhaust system 134. Other engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. In various implementations, the EGR valve 170 may be located after the turbocharger 160. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186. In various implementations, the MAF sensor 186 may be located in a housing with the throttle valve 112.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce the engine torque output during a gear shift. The ECM 114 may also communicate with a hybrid control module 196 to coordinate operation of the engine 102 and an electric motor 198. The electric motor 198 may also function as a generator, and may be used to produce electrical energy for use by vehicle electrical systems and/or for storage in an energy storage device (ESD) 199, such as a battery. The ESD 199 may also be supplied power by other power sources, such as an electrical outlet. The engine system 100 may also include one or more additional electric motors (not shown). In various implementations, the ECM 114, the transmission control module 194, and the hybrid control module 196 may be integrated into one or more modules.

Each system that varies an engine parameter may be referred to as an actuator. For example, the throttle actuator module 116 can change the opening area of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is amount of spark advance. Other actuators include the boost actuator module 162, the EGR valve 170, the phaser actuator module 158, the fuel injection system 124, and the cylinder actuator module 120. The term actuator position with respect to these actuators may correspond to boost pressure, EGR valve opening, intake and exhaust cam phaser angles, air/fuel ratio, and number of cylinders activated, respectively.

The ECM 114 controls the actuators to achieve a desired torque output for the vehicle. The ECM 114 also selectively shuts down the engine 102 when the engine 102 is running to, for example, minimize fuel consumption. While the engine 102 is shutdown, the ECM 114 controls the electric motor 198 to achieve the desired torque output. The temperature of the catalyst 144, however, may fall below the light-off temperature while the engine 102 is shut down. The ECM 114 selectively starts the engine 102 when the catalyst temperature falls below than the light-off temperature to increase the catalyst temperature.

The ECM 114 of the present disclosure selectively disables engine startups that may otherwise be initiated when a maximum torque output of the electric motor 198 is greater than the desired torque output. In this manner, the ECM 114 limits engine startups to when engine torque output may be used to supplement the torque output of the electric motor 198.

The ECM 114 also selectively disables the engine 102 while the engine 102 is running when the electric motor 198 is capable of producing the desired torque output. For example only, the ECM 114 may keep the engine 102 running until the catalyst temperature reaches the light-off temperature. Disabling engine startups and shutting down the engine 102 minimizes fuel consumption and maximizes fuel efficiency of the vehicle.

Figure 2:
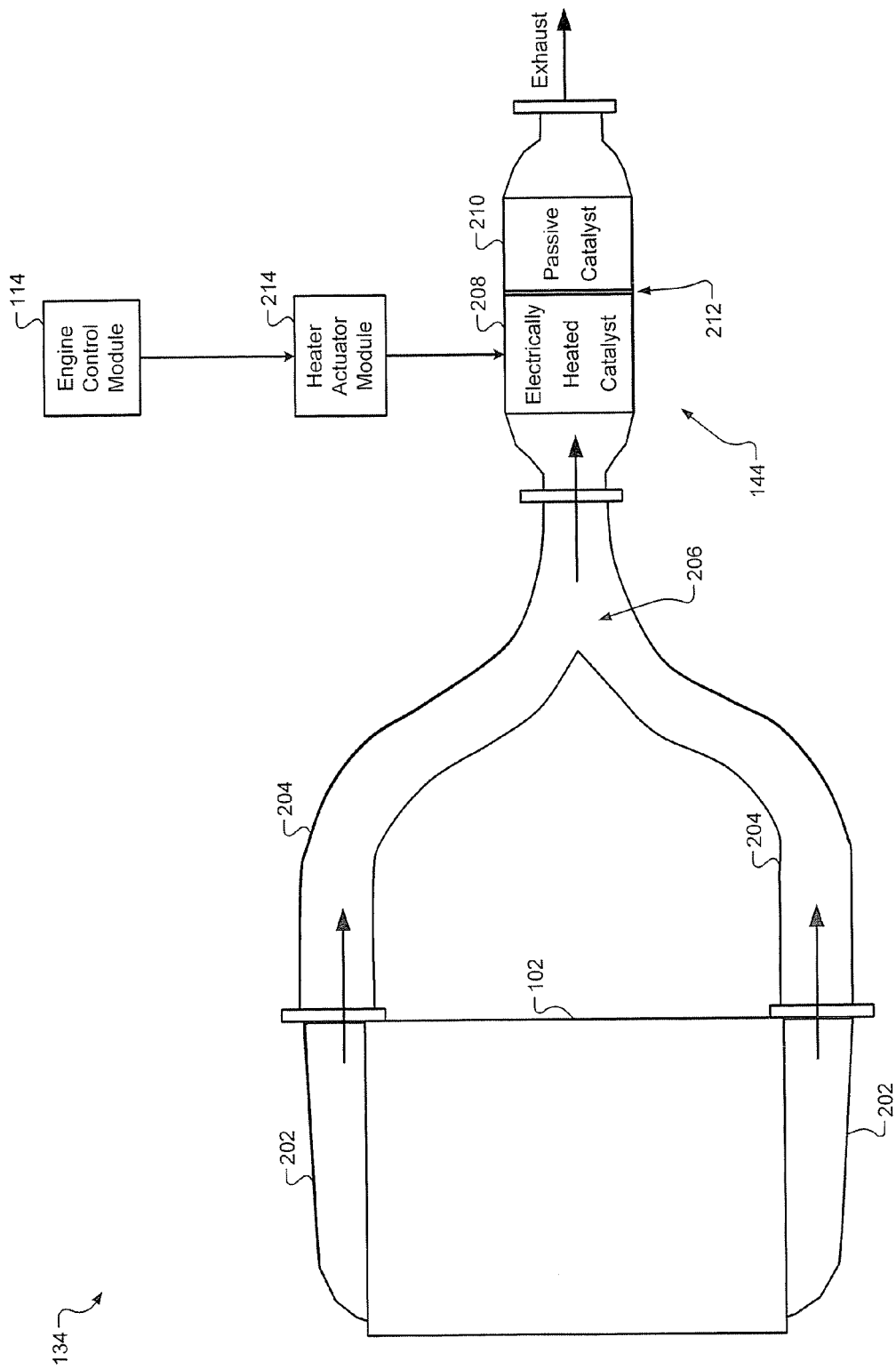
FIG. 2 is a functional block diagram of an exemplary implementation of an exhaust system according to the principles of the present disclosure.

Referring now to FIG. 2, a functional block diagram of an exemplary implementation of the exhaust system 134 is presented. The engine 102 outputs exhaust gas to the exhaust system 134. In engine systems where cylinders of the engine 102 are arranged in two banks, the exhaust gas is output from the engine 102 to two exhaust manifolds 202. Other engine systems may include fewer or more banks. The exhaust gas flows from the exhaust manifolds 202 through associated exhaust pipes 204 to a confluence point 206. The exhaust gas flows through the exhaust pipes 204 and converges at the confluence point 206. The exhaust gas flows from the confluence point 206 to the catalyst 144.

The catalyst 144 includes an electrically heated catalyst (EHC) 208 and a passive catalyst 210. The EHC 208 includes a substrate, such as cordierite, aluminum, and/or another suitable material. The substrate may be formed in a honeycomb arrangement or in another suitable arrangement. A catalyst is applied to the substrates of the EHC 208. The catalyst may include, for example, platinum, rhodium, and/or another three-way catalyst. The catalyst reacts with various components of the exhaust gas to reduce the amount of those components in the exhaust gas. The EHC 208 is separated from the passive catalyst 210 by a buffer zone 212.

The buffer zone 212 may be implemented to, for example, prevent transfer of electricity to the passive catalyst 210.

The passive catalyst 210 also includes a substrate. The substrate may include, for example, cordierite, aluminum, and/or another suitable substrate. The substrate of the passive catalyst 210 may be formed in a honeycomb arrangement or in another suitable arrangement. A catalyst is applied to the substrate of the passive catalyst 210. The catalyst may include, for example, platinum, rhodium, and/or another suitable three-way catalyst. The catalyst reacts with various components of the exhaust gas to reduce the amount of those components in the exhaust gas. In various implementations, the catalyst of the EHC 208 and the passive catalyst 210 is the same catalyst.

The EHC 208 and the passive catalyst 210 are effective in reacting with exhaust gas at temperatures greater than the light-off temperature (e.g., 300-400° C.). In some implementations, the EHC 208 and the passive catalyst 210 may have different light-off temperatures. A heater actuator module 214 selectively applies power to the EHC 208 based on signals from the ECM 114. The power may be supplied from, for example, the electric motor 198, the ESD 199, and/or another suitable power source.

The application of power to the EHC 208, which is electrically resistive, causes the EHC 208 to generate heat. The ECM 114 controls the temperature of the EHC 208 (i.e., the EHC temperature) by controlling the application of power to the EHC 208. The ECM 114 controls the EHC temperature based on the light-off temperature while the engine 102 is shut down when the vehicle is running (e.g., key on). In this manner, the EHC temperature will be at or above the light-off temperature when the engine 102 is started.

Heat produced by the EHC 208 may also warm the passive catalyst 210. For example only, the flow of the exhaust gas may force heat produced by the EHC 208 downstream to the passive catalyst 210. Heat generated near the EHC 208 by reaction with the exhaust gas may also warm the passive catalyst 210. Warming the passive catalyst 210 to the light-off temperature increases volume of the catalyst 144 that is capable of reacting with the exhaust gas.

Figure 3:
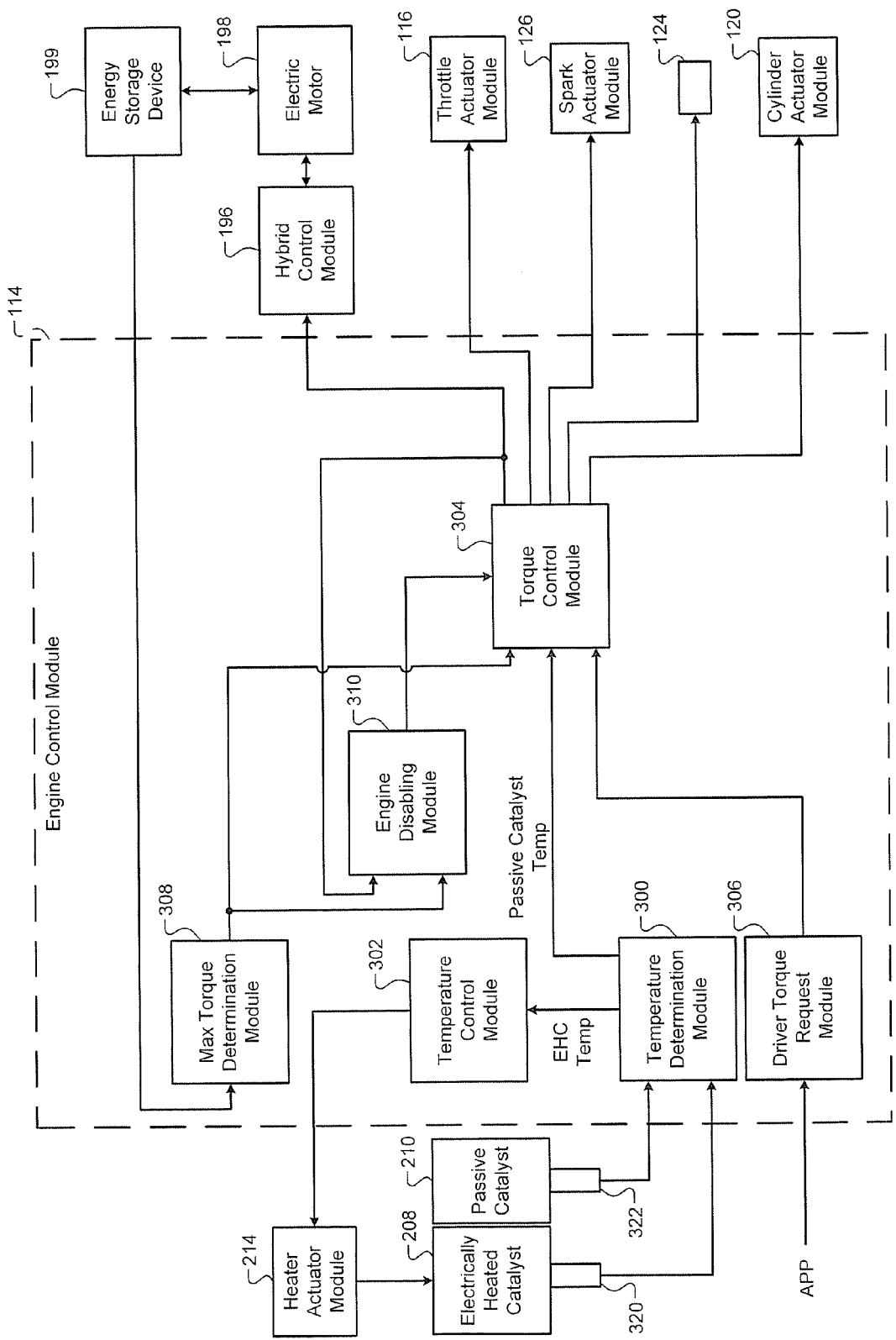
FIG. 3 is a functional block diagram of an exemplary implementation of an engine control module according to the principles of the present disclosure.

Referring now to FIG. 3, a functional block diagram of an exemplary implementation of the ECM 114 is presented. The ECM 114 includes a temperature determination module 300, a temperature control module 302, a torque control module 304, and a driver torque request module 306. The ECM 114 also includes a max torque determination module 308 and an engine disabling module 310.

The temperature determination module 300 determines the EHC temperature. The temperature determination module 300 also determines the temperature of the passive catalyst 210 (i.e., passive catalyst temperature). For example only, the temperature determination module 300 may determine the EHC temperature and the passive catalyst temperature based on temperatures measured by temperature sensors 320 and 322, respectively. In other implementations, another suitable method of determining the EHC and passive catalyst temperatures may be used. The temperature determination module 300 outputs the EHC temperature to the temperature control module 302.

The temperature control module 302 controls the application of power to the EHC 208 via the heater actuator module 214. The temperature control module 302 selectively commands the heater actuator module 214 to apply power to the EHC 208 based on the EHC temperature. For example, the temperature control module 302 commands the heater actuator module 214 to apply power to the EHC 208 to maintain the EHC temperature at or above the light-off temperature, including periods of engine-off time while the vehicle is running. The temperature control module 302 may also selectively command the heater actuator module 214 to apply power to the EHC 208 when the passive catalyst temperature is less than the light-off temperature.

The temperature determination module 300 outputs the passive catalyst temperature to the torque control module 304. The torque control module 304 controls the engine 102 and the electric motor 198 to achieve the desired torque output. The desired torque output may be based on, for example only, torque requested by a driver of the vehicle (i.e., a driver torque request). The driver torque request module 306 may determine the driver torque request based on, for example, the APP, gear ratio, and other suitable parameters. The desired torque output may alternatively or additionally be based on torque output requested by other vehicle systems.

The torque control module 304 controls the electric motor 198 to achieve the desired torque output. In some circumstances, however, the desired torque output may exceed a maximum torque that the electric motor 198 is capable of outputting under the current operating conditions. This maximum torque may be referred to as a maximum motor torque.

The max torque determination module 308 determines the maximum motor torque of the electric motor 198. For example only, the max torque determination module 308 determines the maximum motor torque based on one or more parameters of the ESD 199, such as voltage, current, temperature, and other suitable parameters. The max torque determination module 308 provides the maximum motor torque to the torque control module 304.

The torque control module 304 selectively initiates start up of the engine 102. For example only, the torque control module 304 initiates engine startup when the desired torque output exceeds the maximum motor torque. The torque control module 304 may also selectively initiate engine startup when the passive catalyst temperature is less than the light-off temperature.

Upon engine startup, the torque control module 304 controls the engine 102 and the electric motor 198 to produce the desired torque output. The torque control module 304 also selects a strategy for warming the passive catalyst 210 to the light-off temperature after engine startup. For example only, the torque control module 304 may retard the spark timing and provide a stoichiometric air/fuel mixture to the cylinders of the engine 102. Retarding the spark timing provides an increased amount of HC in the exhaust gas resulting from combustion of the stoichiometric air/fuel mixture. Heat produced by oxidation of the HC warms the passive catalyst 210.

Another strategy that may be employed by the torque control module 304 includes providing a rich air/fuel mixture to every-other cylinder while disabling the provision of fuel and spark to the other cylinders. Disabling fuel and spark to the other cylinders causes intake air to be pumped through the other cylinders and provides an increased amount of oxygen in the exhaust gas. Supplying the rich air/fuel mixture to every-other cylinder provides an increased amount of HC in the exhaust gas resulting from combustion of the rich air/fuel mixture. The increased amounts of oxygen and HC in the exhaust gas provide an environment that is conducive to HC oxidation and, therefore, warming of the passive catalyst 210.

The engine disabling module 310 selectively disables engine startups. The engine disabling module 310 disables engine startups initiated for passive catalyst warming when the maximum motor torque is greater than the desired torque output. In other words, the engine disabling module 310 disables engine startups when the passive catalyst temperature is less than the light-off temperature while the maximum motor torque is greater than the desired torque output.

In this manner, the engine disabling module 310 disables combustion within the engine 102 and maintains the engine 102 as shut down until engine torque output is needed to supplement the torque output by the electric motor 198 to produce the desired torque output. Disabling such engine startups minimizes fuel consumption and increases fuel efficiency by preventing engine startups when engine torque output may not be necessary to achieve the desired torque output.

While the engine 102 is running, the engine disabling module 310 also selectively shuts down the engine 102. For example only, the engine disabling module 310 shuts down the engine 102 when the maximum motor torque is greater than the desired torque output and the passive catalyst temperature is less than the light-off temperature. Shutting down the engine 102 when the maximum motor torque is greater than the desired torque output prevents unnecessary fuel consumption when the electric motor 198 is capable of producing the desired torque output.

Figure 4:
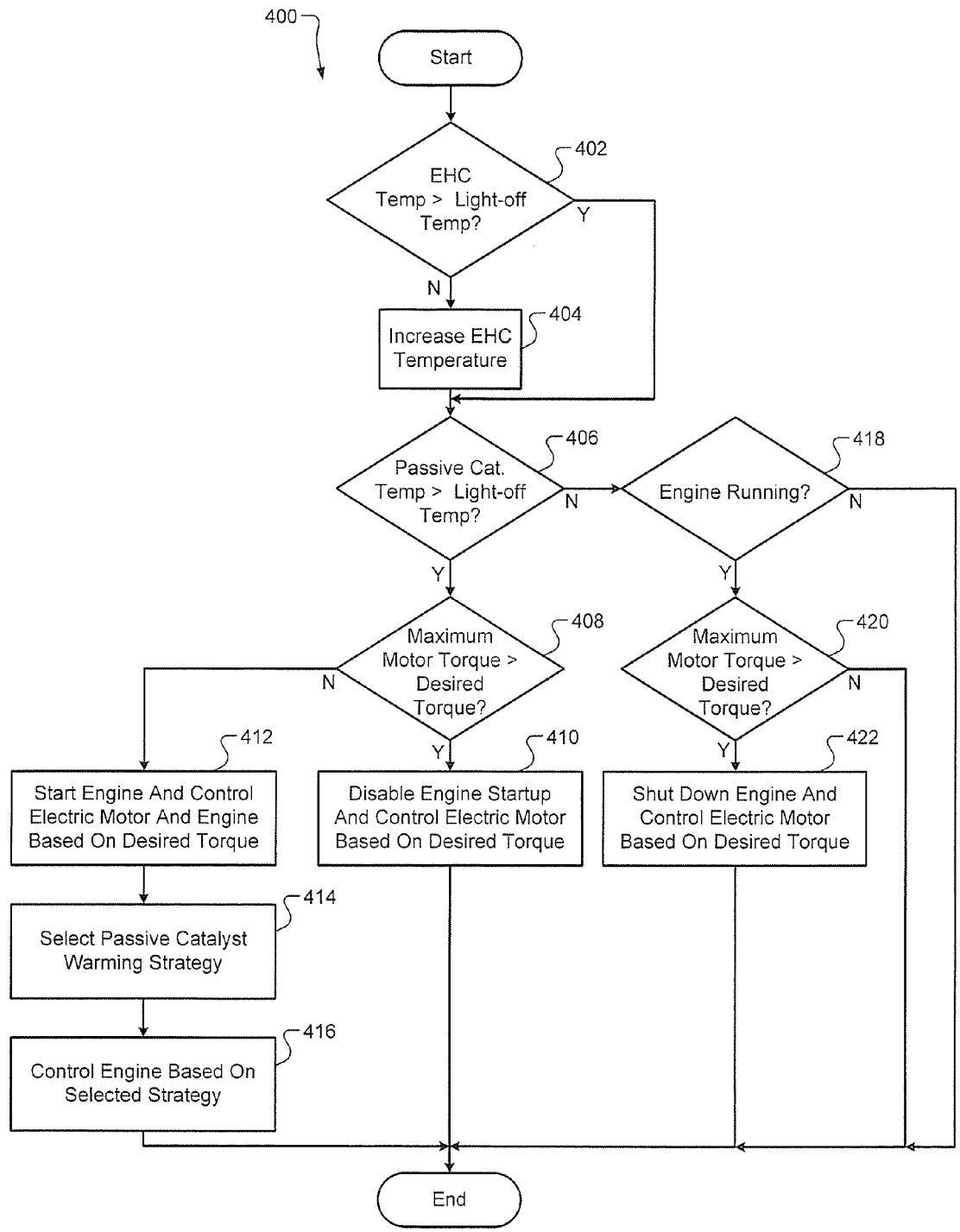
FIG. 4 is a flowchart depicting an exemplary method according to the principles of the present disclosure.

Referring now to FIG. 4, a flowchart depicting exemplary steps performed by a method 400 is presented. The method 400 begins in step 402 where the method 400 determines whether the EHC temperature greater than the light-off temperature. If true, the method 400 proceeds to step 406. If false, the method 400 increases the EHC temperature in step 404 and proceeds to step 406.

In step 406, the method 400 determines whether the passive catalyst temperature is greater than the light-off temperature. If true, the method continues to step 408; if false, the method 400 transfers to step 418 (discussed below). The method 400 determines whether the maximum motor torque is greater than the desired torque output in step 408. If true, the method 400 disables engine startups and controls the electric motor 198 based on the desired torque output in step 410, and the method 400 ends. If false, the method 400 transfers to step 412.

In step 412, the method 400 starts the engine 102 and controls the engine 102 and the electric motor 198 based on the desired torque output. The method 400 selects the passive catalyst warming strategy in step 414 and controls the engine 102 based on the selected strategy in step 416. For example only, the passive catalyst warming strategy may include supplying a stoichiometric air/fuel mixture and retarding the spark timing or supplying a rich air/fuel mixture to every-other cylinder. The method 400 ends after step 416.

Referring back to step 418 (i.e., when the passive catalyst temperature is not greater than the light-off temperature), the method 400 determines whether the engine 102 is running. If true, the method 400 continues to step 420; if false, the method 400 ends. The method 400 determines whether the maximum motor torque is greater than the desired torque output in step 420. If true, the method 400 continues to step 422; if false, the method 400 ends. The method 400 shuts down the engine 102 and controls the electric motor 198 based on the desired torque output in step 422. The method 400 then ends.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
a first electronic circuit configured to regulate a first temperature of an electrically heated catalyst (EHC) based on a first predetermined light-off temperature while an engine is shut down; and
a second electronic circuit configured to:
selectively startup the engine;
selectively disable the startup of the engine when both:
a first determination that a second temperature of a passive catalyst is less than a second predetermined light-off temperature; and
a second determination that a maximum torque output of an electric motor is greater than a desired torque output; and
after the startup, shut down the engine when both:
a third determination that the second temperature is less than the second predetermined light-off temperature; and
a fourth determination that the maximum torque output is greater than the desired torque output,
the shutdown stopping rotation of the engine.

2. The engine control system of claim 1 further comprising a third electronic circuit configured to selectively initiate the startup of the engine when the desired torque output is greater than the maximum torque output when the engine is shut down.

3. The engine control system of claim 2 wherein the third electronic circuit is configured to control a first torque output by the engine and a second torque output by the electric motor based on the desired torque output after the startup.

4. The engine control system of claim 2 wherein the third electronic circuit is configured to, after the startup, select a warming strategy for the passive catalyst and control the engine based on the warming strategy.

5. The engine control system of claim 4 wherein, after the startup, the third electronic circuit is configured to provide a stoichiometric air/fuel mixture to a cylinder of the engine and retard a spark timing of the cylinder.

6. The engine control system of claim 4 wherein, after the startup, the third electronic circuit is configured to provide a rich air/fuel mixture to a first cylinder of the engine and disable provision of fuel and spark to a second cylinder of the engine.

7. A hybrid vehicle system comprising:
the engine control system of claim 1;
the EHC; and
the passive catalyst.

8. A method comprising:
regulating a first temperature of an electrically heated catalyst (EHC) based on a first predetermined light-off temperature while an engine is shut down;
selectively initiating a startup of the engine;
selectively disabling the startup of the engine when both:
a second temperature of a passive catalyst is less than a second predetermined light-off temperature; and
a maximum torque output of an electric motor is greater than a desired torque output; and
after the startup, shutting down the engine when both:
the second temperature is less than the second predetermined light-off temperature; and
the maximum torque output is greater than the desired torque output,
the shutting down of the engine stopping rotation of the engine.

9. The method of claim 8 further comprising selectively initiating the startup of the engine when the desired torque output is greater than the maximum torque output when the engine is shut down.

10. The method of claim 9 further comprising controlling a first torque output by the engine and a second torque output by the electric motor based on the desired torque output after the startup.

11. The method of claim 9 further comprising, after the startup:
   selecting a warming strategy for the passive catalyst; and
   controlling the engine based on the warming strategy.

12. The method of claim 11 further comprising, after the startup:
   providing a stoichiometric air/fuel mixture to a cylinder of the engine; and
   retarding a spark timing of the cylinder.

13. The method of claim 11 further comprising, after the startup:
   providing a rich air/fuel mixture to a first cylinder of the engine; and
   disabling provision of fuel and spark to a second cylinder of the engine.

14. The engine control system of claim 1 further comprising a third electronic circuit configured to initiate the startup of the engine when the desired torque output is greater than the maximum torque output when the engine is shut down and the second temperature of the passive catalyst is less than the second predetermined light-off temperature.

15. The method of claim 8 further comprising initiating the startup of the engine when: (i) the desired torque output is greater than the maximum torque output when the engine is shut down and (ii) the second temperature of the passive catalyst is less than the second predetermined light-off temperature.

16. The engine control system of claim 1 wherein the first and second electronic circuits include at least one of: an Application Specific Integrated Circuit (ASIC); a combinational logic circuit; and a processor and memory.

* * * * *